(12) United States Patent
Schooley (10) Patent No.: US 7,743,796 B1
(45) Date of Patent: Jun. 29, 2010

(54) BOTTLE NECK VACUUM PUMP

(76) Inventor: Bruce A. Schooley, 480 Oakshire Pl., Alamo, CA (US) 94507

( * ) Notice: Subject to any disclaimer, the term of this patent is extended or adjusted under 35 U.S.C. 154(b) by 0 days.

(21) Appl. No.: 11/985,594

(22) Filed: Nov. 15, 2007

(51) Int. Cl.
*B65D 51/16* (2006.01)
(52) U.S. Cl. .......................... 141/65; 141/95; 141/351; 141/381
(58) Field of Classification Search ............. 141/59–61, 141/65, 94–95, 351, 381
See application file for complete search history.

(56) References Cited

U.S. PATENT DOCUMENTS

| | | | | |
|---|---|---|---|---|
| 447,974 | A * | 3/1891 | Rheinstrom ................. | 215/269 |
| 3,602,387 | A * | 8/1971 | Patnaude et al. ............ | 137/854 |
| 4,249,583 | A * | 2/1981 | Lundbladh ................... | 141/65 |
| 4,684,033 | A * | 8/1987 | Marcus ........................ | 215/269 |
| 4,723,670 | A * | 2/1988 | Robinson et al. ............. | 215/228 |
| 4,889,250 | A * | 12/1989 | Beyer ........................ | 215/228 |
| 4,911,314 | A * | 3/1990 | Schneider .................... | 141/65 |
| 5,215,129 | A * | 6/1993 | Berresford et al. ............ | 141/65 |
| 6,530,401 | B1 * | 3/2003 | Angehrn et al. ................ | 141/64 |
| 6,536,306 | B1 | 3/2003 | Harris | |
| 6,637,321 | B2 * | 10/2003 | Wang ......................... | 215/228 |
| 6,651,834 | B2 * | 11/2003 | Wong ......................... | 215/260 |
| 6,874,545 | B1 * | 4/2005 | Larimer et al. ................ | 141/65 |
| 7,086,427 | B2 * | 8/2006 | Bonich ........................ | 141/65 |
| 7,108,023 | B2 * | 9/2006 | Luis ............................. | 141/65 |
| 7,395,942 | B2 * | 7/2008 | Michalopoulos ............. | 141/65 |
| 2001/0040911 | A1 * | 11/2001 | Rubenstein .................. | 374/141 |
| 2002/0117055 | A1 * | 8/2002 | Liebmann, Jr. ............. | 99/277.1 |
| 2003/0047531 | A1 * | 3/2003 | Wong .......................... | 215/260 |
| 2005/0178094 | A1 * | 8/2005 | Brucart Bonich ............ | 53/510 |
| 2006/0070971 | A1 * | 4/2006 | Michalopoulos ............ | 215/228 |
| 2006/0109886 | A1 | 5/2006 | Harris | |
| 2006/0149171 | A1 * | 7/2006 | Vogel et al. ................... | 601/11 |
| 2007/0199615 | A1 * | 8/2007 | Larimer et al. ................ | 141/95 |
| 2008/0035598 | A1 * | 2/2008 | Simons ....................... | 215/228 |
| 2008/0135126 | A1 * | 6/2008 | Lemme ........................ | 141/8 |
| 2008/0142470 | A1 * | 6/2008 | van der Lande ............. | 215/228 |
| 2009/0001041 | A1 * | 1/2009 | Belcastro .................... | 215/228 |

FOREIGN PATENT DOCUMENTS

WO    WO 2008/043151    \*  4/2008

\* cited by examiner

*Primary Examiner*—Gregory L Huson
*Assistant Examiner*—Nicolas A Arnett
(74) *Attorney, Agent, or Firm*—Heisler & Associates

(57) ABSTRACT

Air is removed from a bottle by placing the apparatus over the bottle in a manner similar to that of a cork. A switch is activated by placement of the apparatus over the bottle and causes a pump to evacuate air from an interior of the bottle. A pressure sensor senses reduced pressure and shuts off the pump when a sufficiently low pressure is reached. An indicator also visually indicates that a vacuum state exists within the bottle. A temperature probe is provided, coupled to a display for visual readout of temperature of liquid within the bottle. A tilt sensor is provided to shut off the pump if the apparatus is tilted excessively. A button is provided which can be depressed to cause air to return into space in the bottle to return the bottle interior back to atmospheric pressure for removal of the apparatus.

11 Claims, 4 Drawing Sheets

BOTTLE NECK VACUUM PUMP

FIELD OF THE INVENTION

The following invention relates to vacuum pumps attachable to a neck of a bottle to remove at least a portion of air from within the bottle. More particularly, this invention relates to vacuum pumps for generating at least partial vacuum within a bottle neck and which automatically turn the vacuum pump on and off and which automatically indicate the pressure condition within the bottle and which can also provide an indication of liquid temperature within the bottle.

BACKGROUND OF THE INVENTION

To enjoy wine to its fullest, not only must the wine be aged for a proper amount of time, but also it must be treated properly in a variety of different ways to maintain optimal quality. Before the wine bottle is opened, the wine is typically stored in a relatively low and constant temperature dark space. After the bottle is opened, some wines can be enjoyed immediately, while others, particularly red wine, benefit from a small amount of exposure to oxygen before drinking. However, it is undesirable to have the wine exposed to oxygen in the atmosphere for too long of a period of time. Otherwise, excessive oxidation will occur destroying much of the flavor of the wine.

Due to these constraints on enjoying a bottle of wine, often individuals will resist opening a bottle of wine unless the entire bottle can be enjoyed at that time. After a bottle has been opened, there is pressure to enjoy the entire bottle of wine even after an optimal quantity of wine has already been enjoyed. Accordingly, a need exists for a convenient way to preserve wine within a bottle after the bottle has been opened.

A common prior art technique is to merely replace the cork in the wine bottle. If the wine bottle has only had a relatively small amount removed therefrom, only a small amount of oxygen is introduced into the water so that a minimum of degradation of wine within the bottle occurs. However, some degradation does still occur. As a greater amount of wine has been poured from the bottle, merely replacing the cork is an even less desirable solution. Rather, oxygen within the air that remains trapped beneath the cork is sufficient to oxidize wine within the bottle and destroy a significant portion of the flavor of the wine.

Accordingly, a need exists for a way to preserve wine or other beverages within its original bottle after the cork has been popped. Such a method would beneficially be provided in a configuration which is easy for consumers to use.

SUMMARY OF THE INVENTION

With this invention a bottle neck vacuum pump is provided which can be placed over a neck of a bottle and evacuate a significant portion of air from the bottle. In this way, insufficient oxygen remains within the bottle to cause damage to the wine or other liquid within the bottle. Rather, wine or other liquid remaining within the bottle is preserved in a state very similar to that which it enjoyed before the bottle was opened.

The apparatus of this invention has a surface wall that is brought adjacent to to neck of the bottle and overlying the rim thereof to close off the opening in the neck of the bottle. This surface wall preferably includes a seal to prevent significant air leakage at an interface between the surface wall and the rim of the bottle neck. This seal preferably additionally includes an inner sleeve which extends down into the neck of the bottle and seals with an inside surface of the bottle.

An air conduit is formed within the surface wall and leads to a vacuum pump. A switch is provided near the surface wall which is activated when the neck of the bottle is placed near the surface. This switch causes the pump to be turned on and to cause air to be pulled through the air conduit and out of an enclosure defined as a space above the liquid within the bottle. The air conduit also leads to an indicator in fluid communication with air within the air conduit. The indicator is biased toward a first position, preferably extending up out of a top of the apparatus. This highest position indicates atmospheric pressure within the bottle. As the pump operates, air is evacuated from the space within the bottle and pressure therein is reduced. Correspondingly, the indicator moves downward indicating this reduction in pressure. Once this indicator is all the way down, it indicates preferably a near vacuum atmosphere within the bottle.

Movement of this indicator to a low pressure position preferably simultaneously also moves a plate against a contact to close a circuit which causes the pump to shut off. In this way, once a near vacuum atmosphere has been attained within the bottle, the pump shuts off.

A temperature probe is preferably provided extending through the surface and into the space above the liquid and within the bottle. After the apparatus has been in place upon the bottle for sufficient time to allow a temperature of the temperature probe to match that of the liquid, the display can be activated to visually display a temperature of the liquid within the bottle. Such a temperature probe is to be used immediately after placement of the apparatus onto the bottle, and before heat transfer can occur to cool down the temperature probe. Specifically, the bottle is tilted to bring the liquid into contact with the temperature probe so that a more immediate accurate temperature for the liquid within the bottle can be obtained.

Preferably, optimal temperatures for different types of wines or other beverages are printed directly on the housing of the apparatus. In this way, users can cool or heat the wine or other liquid to an optimal temperature to maximize the enjoyment of the wine drinking experience. When a wine or other liquid is again to be enjoyed, a return button can be pushed to cause an inlet hole to be moved into fluid communication with the space within the bottle, such that air can return back into the bottle to equalize pressure. The apparatus can then be easily removed from the bottle.

OBJECTS OF THE INVENTION

Accordingly, a primary object of the present invention is to provide a pump that can seal with a neck of a bottle and remove a portion of air from within the bottle to more effectively preserve wine or other liquids within the bottle.

Another object of the present invention is to provide a vacuum pump that automatically turns on when the vacuum pump and associated structure are placed upon the neck of the bottle.

Another object of the present invention is to provide a vacuum pump for a bottle neck which only operates when the bottle is oriented with a long axis substantially vertically.

Another object of the present invention is to provide a vacuum pump which automatically turns off when a desired low pressure is reached.

Another object of the present invention is to provide a vacuum pump easily attachable to a bottle neck and easily removable after utilization of a pressure equalization subsystem.

Another object of the present invention is to provide a method for removing air from within a bottle.

Another object of the present invention is to provide a vacuum pump for a bottle neck which indicates to a user a degree of vacuum within the bottle.

Another object of the present invention is to provide a vacuum pump for a bottle neck which prevents pumping of liquid out of the bottle.

Other further objects of the present invention will become apparent from a careful reading of the included drawing figures, the claims and detailed description of the invention.

DESCRIPTION OF THE PREFERRED EMBODIMENT

Figure 1:
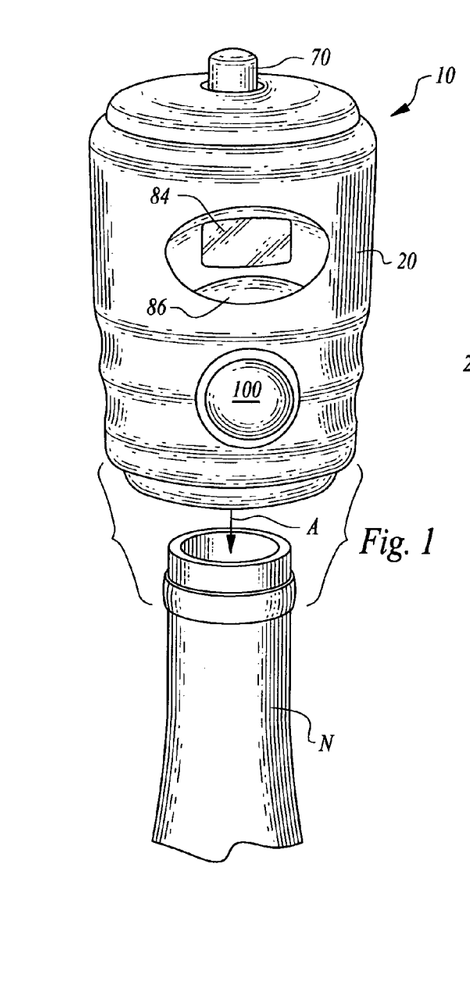
FIG. 1 is a perspective view of the bottle neck vacuum pump apparatus of this invention being placed upon a neck of a bottle.
Figure 2:
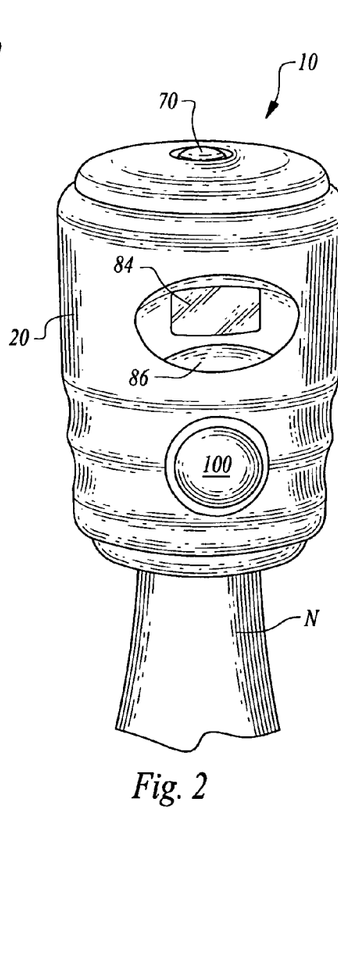
FIG. 2 is a perspective view similar to that which is shown in FIG. 1, but after the apparatus of this invention has been placed upon a neck of a bottle.

Referring to the drawings, wherein like reference numerals represent like parts throughout the various drawing figures, reference numeral 10 is directed to an apparatus (FIGS. 1-3) which includes a pump 60 therein and which can be placed over a neck N of a bottle for removal of air from a space S (FIGS. 4 and 5) within the bottle, such as to halt an oxidation reaction within the bottle. This invention allows liquids L within a bottle to be kept fresher for a longer period of time than would be the case if air were not evacuated from the space S within the bottle.

Figure 4:
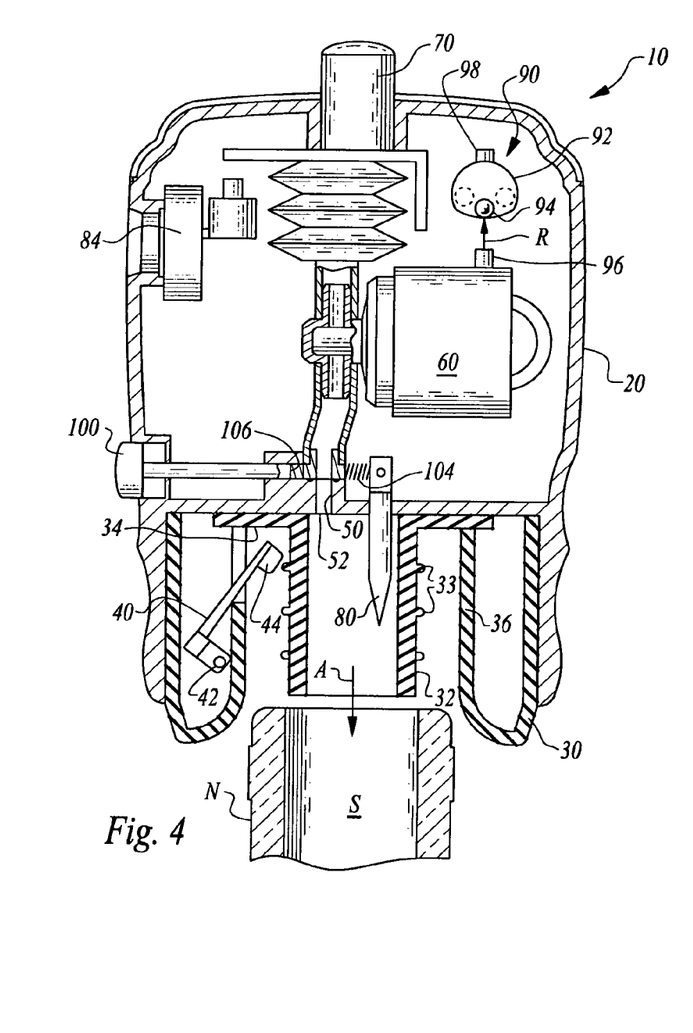
FIG. 4 is a full sectional view of the apparatus of this invention just before placement of the apparatus on a neck of a bottle and showing interior details of the apparatus.
Figure 5:
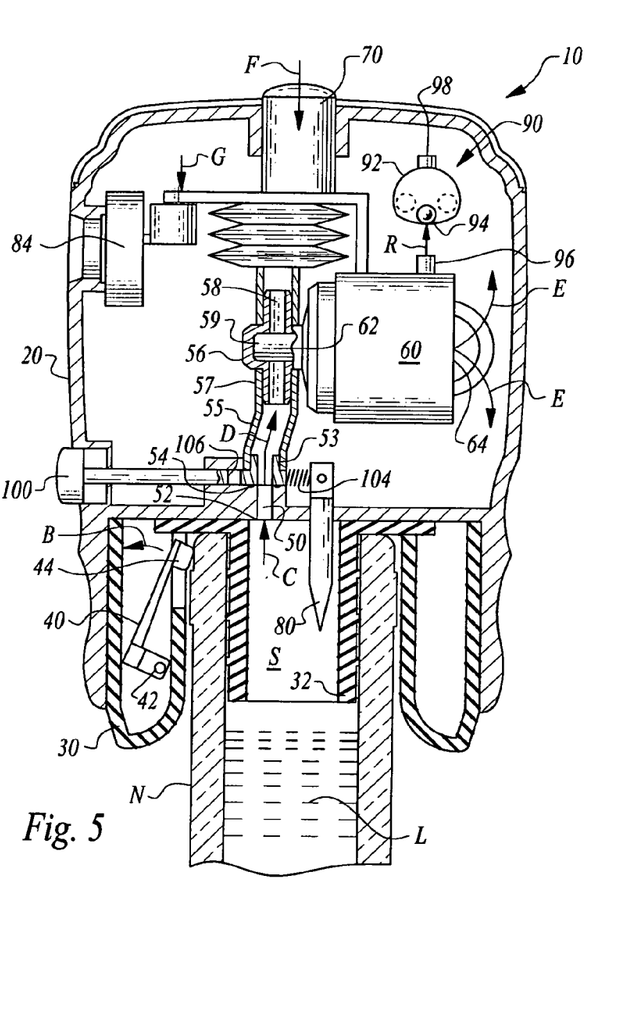
FIG. 5 is a full sectional view similar to that which is shown in FIG. 4 but after the apparatus has been placed entirely upon a neck of a bottle and with activation of the pump and the beginning of removal of air from the bottle.

In essence, and with particular reference to FIGS. 4 and 5, general details of this invention are described according to a preferred embodiment. The apparatus 10 is contained within a housing 20 defining an outermost portion of the apparatus 10. This housing 20 is generally completely enclosed except for a lower end thereof which is adapted to receive a neck N of a bottle therein against a surface wall of the housing. A seal 30 is provided adjacent the surface wall that is brought close to the rim of the bottle neck N when the apparatus 10 is placed upon the neck N of the bottle. This seal 30 helps to prevent leakage of air into an enclosure between the surface wall of the apparatus 10 and the rim on the neck of the bottle. A switch 40 is provided adjacent the surface wall in a position which causes the switch 40 to be activated by placement of the neck N of the bottle adjacent the surface wall. The switch 40 is coupled to the pump 60 to cause the pump 60 to be activated when the switch 40 is activated.

An air conduit 50 passes through the surface wall of the apparatus 10 and leads to the pump 60. Thus, when the pump 60 becomes operational, it begins sucking air through the air conduit 50 and out of the space S within the bottle. An indicator 70 is preferably coupled to the air conduit 50 and/or the pump 60 in such a way that the indicator 70 is exposed to pressure within the air conduit 50 and within the space S. The indicator 70 is biased toward an elevated position that is indicated when atmospheric conditions exist within the bottle to which the apparatus 10 is connected. As pressure within the bottle is reduced, the indicator 70 moves downward, indicating the degree of vacuum within the bottle. When this indicator reaches a lowest position, portions of the indicator can be utilized to close a circuit, and to instruct the pump 60 to shut off.

The surface wall of the apparatus also preferably includes a temperature probe 80 which extends down into the neck N of the bottle when the apparatus 10 is coupled to the neck N of the bottle. The temperature probe 80 allows temperature of liquid within the bottle to be measured. When the apparatus 10 is tilted along with a bottle, an orientation switch 90 is activated which causes deactivation of the pump 60. In this way, the pump 60 cannot operate when the bottle is tilted and any possibility of the pump 60 pumping liquid L out of the bottle is avoided.

When air is to be returned to the bottle, such as when the apparatus 10 is desired to be removed, a user first pushes an air return button 100. This air return button 100 is coupled to an arm 102 which causes the air conduit 50 to be displaced from the space S and for a separate inlet hole 106 to be aligned with the space S. Air can then return into the bottle to equalize pressure inside and outside of the bottle. The apparatus 10 can then be relatively easily removed.

Figure 3:
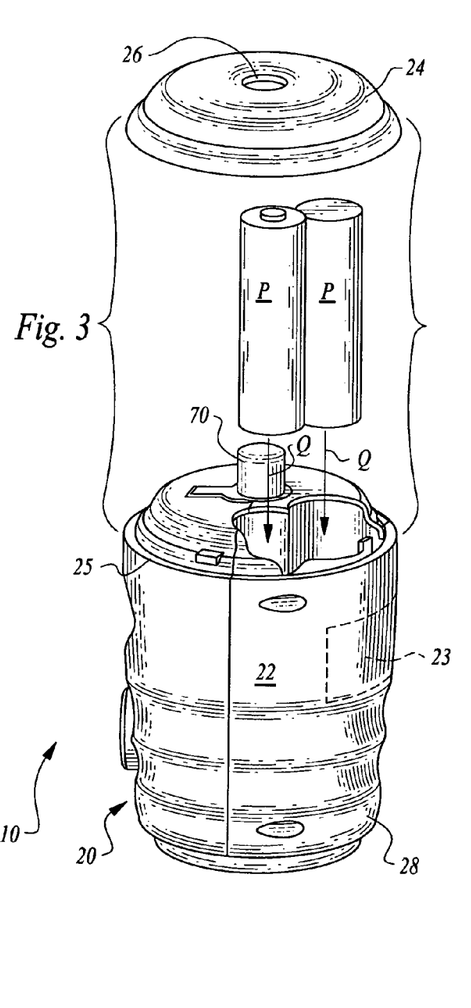
FIG. 3 is a perspective view of that which is shown in FIGS. 1 and 2 and with a cap removed to illustrate how batteries fit within a battery chamber within the apparatus of this invention.

More specifically, and with particular reference to FIGS. 1-3, 8 and 9, details of the housing 20 are described, according to the preferred embodiment. The housing 20 provides an outer enclosure for the apparatus 10 within which the various different components of this invention are held together and protected from damage, while also providing a desirable external appearance. This housing 20 is generally in the form of a cylindrical enclosure with a cylindrical side wall 22 extending from a cap 24 at an upper end thereof down to a skirt 28 at a lower end thereof and with a surface wall closing off an interior lower portion of the housing 20. The cap is preferably generally circular. The side wall 22 is preferably formed of two separate hemi-cylindrical structures that are attached together. The cap 24 is removable to allow access to a chamber for batteries or other power cells P (FIG. 3). The batteries P are placed into a chamber formed within the housing 20 by translation along arrows Q (FIG. 3). The chamber is spaced from the plane in which the sectional views of FIGS. 4-7 are provided, but is located within the same housing that includes the pump 60.

The cap 24 preferably includes a hole 26 in a central portion thereof through which the indicator 70 can pass. A rim 25 defines a portion of the side wall 22 directly below the cap 24 and which engages the cap 24. A lower portion of the side wall 22 is in the form of the skirt 28 which surrounds a hollow ring-shaped opening into which the neck N of a wine bottle or other bottle is inserted for use with the apparatus 10 according to this invention. A rear portion of the side wall 22 preferably includes printing 23 thereon, such as printing to identify most preferred temperature ranges for different types of wines or other beverages.

With particular reference to FIGS. 4-7, details of the seal 30 interposed between the surface wall and the neck N of the bottle is described, according to this preferred embodiment. The seal 30 is preferably formed of a resilient material such as rubber or silicone. The seal 30 is particularly constructed of an inner sleeve 32 extending cylindrically and radially symmetrical about a central axis of the seal to form an inner sleeve 32. This inner sleeve 32 is generally cylindrical in form and has a diameter similar to that of an inside of the bottle to be sealed. This inner sleeve 32 extends down from an annulus 34 which is generally planar in form and aligned with the surface wall of the apparatus 10.

The inner sleeve 32 preferably includes ribs 33 extending radially from the inner sleeve 32. These ribs 33 have a friction fit with an inside surface of the neck N of the bottle, such that a relatively tight seal is provided between the inner sleeve 32 of the seal 30 and the inside surface of the neck N of the bottle. In addition to the annulus 34, the seal 30 preferably includes an outer sleeve 36 which acts somewhat as an alignment bumper for the apparatus 10 to assist in properly aligning both the apparatus 10 and the neck N of the bottle about a common axis.

With continuing reference to FIGS. 4-7, details of a switch 40 for pump 60 activation is described according to a preferred embodiment. In a most preferred embodiment of this invention, the switch 40 is in the form of some form of translating button adjacent the surface wall and passing through the annulus 34. In this way, the switch 40 is not toggled for actuation of the vacuum pump until the apparatus 10 has been fully placed down upon the neck N of the bottle (FIG. 5). While such a switch could be merely in the form of a post that is abutted by the rim of the neck N, an alternative embodiment shown in the figures. This switch 40 is in the form of an elongate arm with a pivot 42 at an end spaced from where the bottle is to be located when the apparatus 10 is in operation. A tip 44 is located opposite the pivot 42. In this embodiment, the pivot 42 is away from a position where the bottle is defined as entirely configured when the apparatus 10 is pressed firmly down onto the neck N of the bottle (along arrow A of FIG. 1), the neck N abuts the tip 44 of the switch 40 and the switch 40 pivots about the pivot 42. Such pivoting of this switch 40 in turn sends a signal to the pump 60 to cause the pump 60 to shut off.

With particular reference to FIG. 5, details of the air conduit 50 and pump 60 leading from the space S within the neck N of the bottle and the pump 60 is described. This air conduit 50 could have a variety of different forms, but preferably is a pathway that is closed except for at two ends. A first end is in the form of an outlet 52 in the space S formed in the lower surface wall of the housing 20 on a side of the annulus 34 opposite the rim of the neck N of the bottle. This outlet 52 is surrounded by a collar 53 that extends away from the space S. This collar 53 supports a flexible lower tube 55 that extends up from the collar 53 to a manifold 56. The manifold 56 has an upper pipe 58 and a lower pipe 57 with the lower pipe 57 supporting the lower tube 55 thereon and with the upper pipe 58 supporting an upper pipe tube 72 thereon. A central chamber 59 is provided in a center of the manifold 56. This central chamber 59 is in fluid communication with an inlet 62 of the pump 60. Thus, the air conduit 50 directs air from the space S (along arrow C of FIG. 4), through the outlet 52 and the collar 53 (along arrow I of FIG. 4), through the lower tube 55, into the manifold 56 and then through the central chamber 59 of the manifold 56 and into the inlet 62 of the pump 60.

Figure 7:
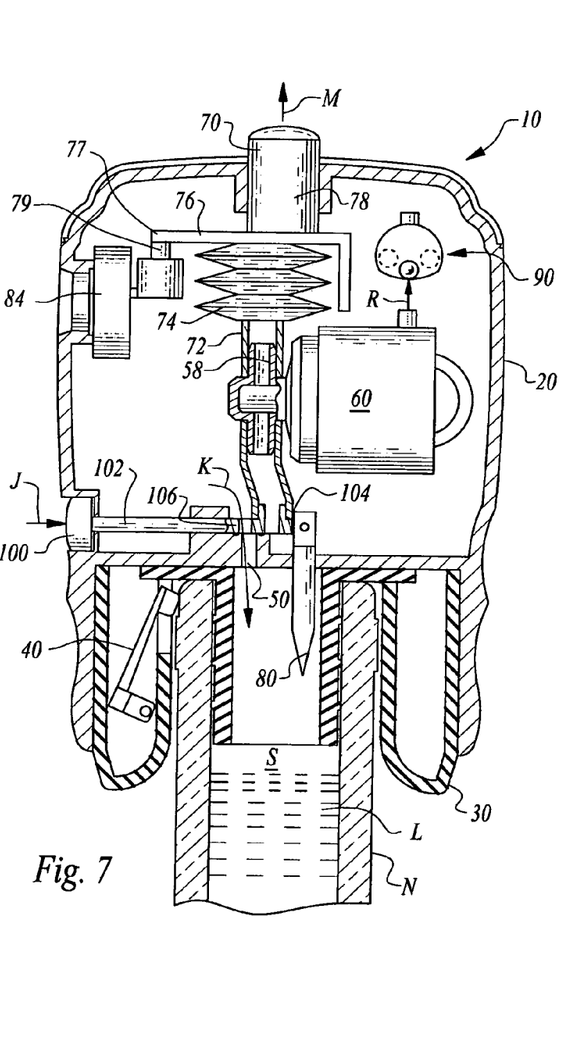
FIG. 7 is a full sectional view similar to that which is shown in FIGS. 4-6 but after air has been removed from the space within the bottle and during the process of returning air into the bottle to equalize pressure sufficiently to allow removal of the apparatus from the bottle neck.
Figure 8:
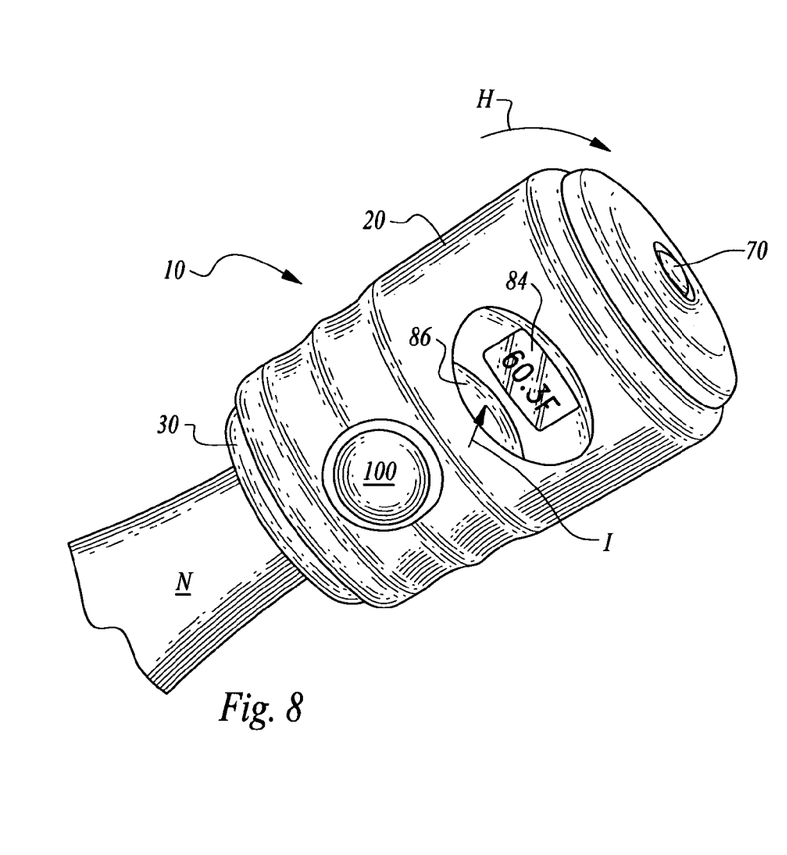
FIG. 8 is a perspective view of the apparatus of this invention shown tilted and corresponding with FIG. 6 for indication of the temperature of liquid within the bottle.
Figure 9:
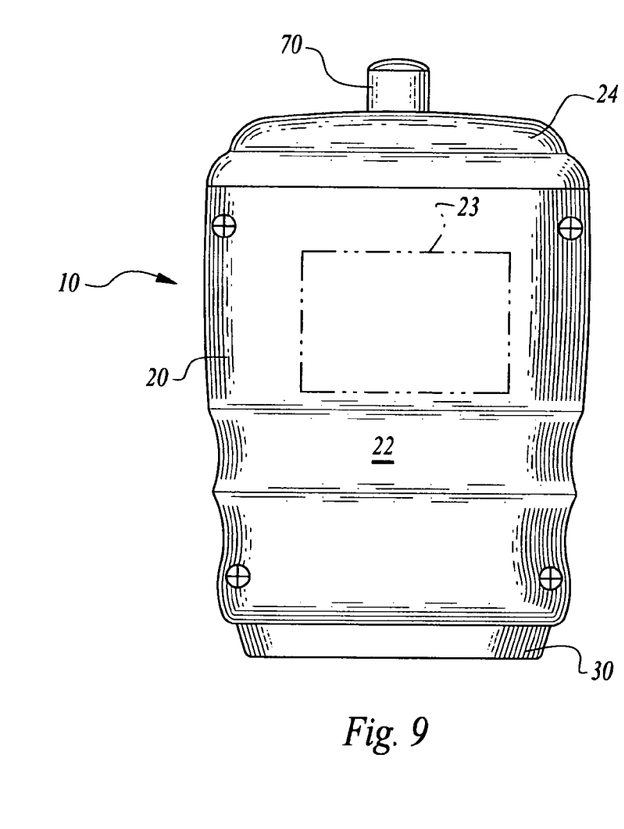
FIG. 9 is a rear elevation view of the housing of the apparatus and illustrating a region where optimal wine temperature or other liquid temperature information can be provided.

The collar 53 is preferably coupled to the air return button 100 and associated arm 102 (FIG. 7). Thus, this collar 53 can translate laterally. In a first position (FIG. 5) the collar 53 is aligned with the outlet 52 so that air can pass from the space S, through the outlet 52, through the collar 53 and into the lower tube 55 leading to the pump 60. Note however that when the air return button 100 is translated, that the air conduit 50 is at least partially interrupted. Details of the air return button 100 and associated structure are described below in more detail.

Flow of air through the air conduit 50 can be described as first passing along arrow C, then passing along arrow D before passing into the inlet 62 of the pump 60. The air then passes out of the pump 60 along arrow E at an outlet 64 of the pump 60. This outlet could be out through an exterior of the housing 20. However, most preferably the housing 20 is not sealed so that the air can merely be discharged within an interior of the housing 20 and still filter out through the housing 20 through various seams in the housing 20. While the specific air conduit 50 is described above, the air conduit could be any form of pathway that leads from the space S within the neck N of the bottle to the pump 60 so that air can be evacuated from the space S within the neck N of the bottle by action of the pump 60.

The pump 60 is preferably of a positive displacement type which is sealed appropriately so that when the pump 60 is not operating it still acts to keep air from flowing back into the air conduit 50. For instance, the pump 60 could be a piston pump with sufficiently tight tolerances or sufficient seals or other rings so that air does not leak into the air conduit 50, or only leaks exceptionally slowly. Operation of the pump 60 merely requires that appropriate electric current and voltage be supplied through the pump 60. This electric current is preferably supplied by batteries or other power cells P (FIG. 3). Electric circuitry has been omitted, but would lead from the batteries P to the pump 60.

This circuitry preferably also passes through three switches. The first switch is coordinated with the switch 40 described above so that the pump 60 cannot receive power unless the switch 40 is closed, indicating that the neck N of the bottle is adjacent the seal 30 and adjacent the housing 20. A second switch is sensitive to pressure and is described in detail below as part of the indicator 70. In essence, when a sufficiently low pressure is sensed within the space S the switch opens so that electric current no longer passes to the pump 60 and pump 60 operation ceases. This pressure sensitive switch has the ability to close again if the pressure rises within the space S above a predetermined amount.

For instance, the pressure sensing could be set so that when approximately 0.1 psi of pressure or more is present within the space S, the pressure sensitive switch would be closed and the pump 60 would operate. When the pressure gets any lower, the switch would open and the pump 60 would cease to operate.

The third switch is an orientation switch 90 described in detail below. In essence, it opens and interrupts electric power to the pump 60 whenever an orientation of the apparatus 10 and associated neck N of the bottle is tilted beyond a predetermined tilt angle, such as fifteen percent. In this way, if the bottle is tilted or falls over, the pump 60 will not evacuate liquid through the air conduit 60 and damage the pump 60 and otherwise make a mess within the apparatus 10 and potentially surrounding areas. When all of these switches are closed, the pump 60 operates to evacuate air through the air conduit 50 and out of the space S. If one or more of the switches are open, the pump 60 does not operate. As an alternative to a simple series circuit, a logic device could receive input from the switches and follow a program to control the pump 60 operation.

With particular reference to FIG. 7, details of the indicator 70 and associated pressure sensitive switch are described, according to a preferred embodiment. The indicator 70 provides one form of a means to sense pressure within the space S and indicates to a user the status of pressure within the space S, whether the air has been largely evacuated or whether the air has not yet been evacuated from the space S. In particular, the indicator 70 is preferably a cylindrical post extending up through the hole 26 in the cap 24. The manifold 56 of the air conduit 50 includes an upper pipe 58 extending up towards an indicator 70. The upper tube 72 is supported on the upper pipe 58 and extends up to the indicator 70. The upper tube 72 is distinct from the lower tube 55 in that the upper tube 72 is preferably rigid, while the lower tube 55 is preferably flexible.

Most preferably, a piston resides within the upper tube and can slide up and down within the tube. The piston is coupled to the indicator 70. A spring can bias the piston in a high position with the indicator 70 up. When low pressure vacuum exists in the air conduit 50, space S and associated upper tube 72, the piston moves down by action of atmospheric pressure, loading the spring and moving the indicator 70 down. An alternative to such a piston and spring pressure sensor is to mount a bellows 74 to the upper tube 72.

In such an alternative embodiment, between the upper tube 72 and the indicator 70, the bellows 74 or some other form of resilient flexible link can be provided. In the case of the bellows 74, an inside of the upper tube 72 is in fluid communication with the inside of the bellows 74. When the pressure is high, the indicator 70 is held up out of the hole 26 in the cap 24 through the bellows 74 which is biased toward a somewhat taller form. When air pressure is reduced, the bellows 74 collapses to a shorter form and causes the indicator 70 to slide down further into the housing 20 and only slightly extending up through the hole 26 in the cap 24. In this way, the indicator 70 indicates to a user whether there is pressure within the bottle.

In particular, when the apparatus 10 is first placed over the neck N of the bottle and the pump 60 begins to operate, the indicator 70 is in a highest position extending out of the hole 26. As the air is evacuated through the pump 60, the indicator 70 moves downward (along arrow F of FIG. 5). When air has been substantially removed from the space S the indicator 70 only slightly sticks out of the hole 26 in the cap 24, indicating that a vacuum condition exists within the space S. When air is returned back into the space S the indicator moves back up out of the hole 26 to its original position (along arrow M of FIG. 7).

The indicator 70 can also act as a pressure sensitive switch for controlling operation of the pump 60. In particular, a plate 76 is preferably interposed between the indicator 70 and the bellows 74 or otherwise coupled to the indicator 70 or other portions of the bellows 74. This plate 76 thus moves up and down along with movement of the bellows 74 and movement of the indicator 70. As pressure is reduced and the indicator 70 moves downward (along arrow F) the plate 76 is eventually brought into contact with a contact 79 (FIG. 7) and on end 77 of the plate 76 can interact with this contact 79 (along arrow G of FIG. 5). Either the plate 76 can itself complete or interrupt a circuit or it can push a button, such as that depicted as the contact 79, to cause a switch to open to interrupt power to the pump 60 or close to send a signal to a logic circuit which controls operation of the pump 60 to indicate to the pump 60 that a sufficiently low pressure has been reached and that the pump 60 can be shut off. The interaction of the plate 76 with the contact 79 can be either in the nature of an on or off interaction or can act to measure an amount of pressure remaining from within the space S by measuring a distance between the plate 76 and the contact 79. If desired, the pressure could be correlated to a numerical pressure value in pounds per square inch or other units and displayed on the display 84.

Another option for shutting off the pump 60 is to include a timer that shuts off the pump 60 after it has operated for an amount of time expected to provide sufficient vacuum in the space S within the bottle. Such a timer could replace the pressure sensor or work with the pressure sensor and help to keep the pump 60 from running too often and using up battery power. For instance, the timer could limit the pump 60 to two minutes of operation every hour (unless reset by removal of the apparatus 10 from the bottle neck N). A simple system could limit pump 60 operation to a set time (i.e. two minutes) until the switch 40 indicates removal of the apparatus 10 from the neck N.

Figure 6:
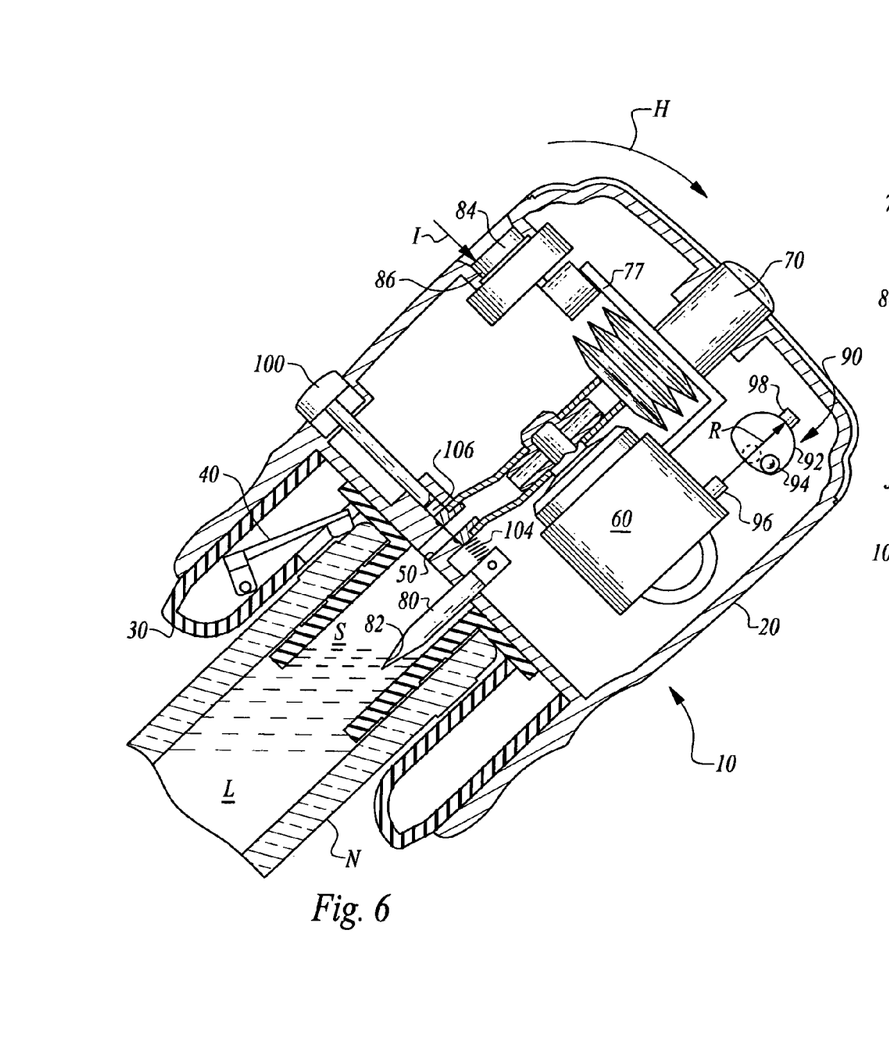
FIG. 6 is a full sectional view similar to that which is shown in FIGS. 4 and 5 but with the bottle and apparatus tilted, and illustrating how such tilting allows a temperature probe to have direct contact with liquid within the bottle and how such tilting can be sensed by the pump to cause shut off of the pump.

With particular reference to FIG. 6, details of a temperature probe 80 are described, according to a preferred embodiment. Most preferably, the apparatus 10 includes a temperature probe 80 for monitoring of temperature of the liquid L within the bottle. This temperature probe 80 preferably extends through the lower surface wall on a lower portion of the housing 20. The temperature probe 80 extends to a point 82 most distant from the wall and extending into the neck N of the bottle. This temperature probe 80 is preferably inboard of the inner sleeve 32 of the seal 30.

The temperature probe 80 also works with a display 84 in the side wall 22 of the housing 20. The display 84 is preferably in the form of a liquid crystal display which can display numbers and/or letters indicative of temperature. A selector pad 86 is also preferably provided adjacent the display 84. This selector pad 86 can act to turn on the temperature probe 80 and to turn on a light to make the display 84 most easily readable. Depression of the selector pad 86 along arrow I of FIGS. 6 and 8 preferably causes the temperature probe 80 to only operate for a short period of time to conserve battery strength.

The temperature probe 80 can be used in two distinct ways. First, after the apparatus 10 has been placed over a neck N of a bottle and sufficient time has elapsed, the apparatus 10 and all of the associated components including the temperature probe 80 will have attained a temperature similar to that of the liquid L within the bottle. After such a duration of time (typically no more than thirty minutes), an accurate temperature reading can be provided for the liquid L within the bottle. If it is desired to obtain an accurate temperature measurement immediately after placing the apparatus 10 upon the neck N, the following procedure is followed. First, the bottle and apparatus 10 are pivoted together (about arrow H of FIG. 6) until the liquid L within the bottle is brought into direct contact with the point 82 of the temperature probe 80. An amount of rotation along arrow H required depends on an amount of liquid L within the bottle. Once the liquid L comes into contact with the point 82 of the temperature probe 80, the user can then depress the selector pad 86 (along arrow I of FIGS. 6 and 8) and an accurate reading of temperature can be obtained.

In a most preferred form of this invention, when the selector pad 86 is pushed twice in succession the temperature display 84 changes to read temperature in degrees Celsius rather than degrees Fahrenheit. The display can be converted back to display in degrees Fahrenheit by again pushing the selector pad 86 multiple times in succession.

With particular reference to FIGS. 6 and 7, details of an orientation switch 90 are described, according to a preferred embodiment. Most preferably, the pump 60 has a switch coupled thereto which monitors the orientation of the apparatus 10. As described above, when the apparatus 10 is sufficiently tilted it is desirable that power to the pump 60 be interrupted to cease pump 60 operation. This orientation switch 60 could take on a variety of different forms but most preferably is configured as depicted in FIGS. 6 and 7 as the orientation switch 90. In particular, a hollow enclosure 92 is provided with a ball 94 residing within the enclosure 92. This ball 94 is opaque. A light source 96 is oriented to shine a ray of light R through the enclosure 92. A light sensor 98 is on a side of the enclosure 92 opposite the light source 96. This pathway for the light R preferably passes through a lowermost portion of the enclosure 92 when the apparatus 10 is oriented vertically as shown in FIG. 7. Thus, the ray of light R hits the ball 94 and interrupts passage of the light from the light source 96 to the light sensor 98. When such a condition exists, the orientation switch 90 is closed and the pump 60 is allowed to operate.

If the apparatus 10 is tilted slightly, the ball 94 can roll away from this lowermost position either to the left or to the right (or forward or backward) within the generally spherical, but preferably somewhat ellipsoidal enclosure 92. Once the ball 94 has been displaced to the left or the right (as depicted in broken lines in FIG. 7 and depicted in solid lines in FIG. 6), the ray of light R can pass from the light source 96 to the light sensor 98. In this configuration the orientation switch 90 is preferably opened to stop pump 60 operation. In this way, the apparatus 10 is prevented from pumping liquid L out of the bottle through the pump 60.

With particular reference to FIG. 7, details of an air return button 100 and system for returning air back into the space S within the bottle are described, according to a preferred embodiment. As described above, the lower tube 55 of the air conduit 50 is preferably flexible and mounted to a collar 53 which is slideably mounted upon the arm 102. This arm 102 is allowed to slide horizontally when a button 100 extending through the housing 20 is depressed.

Preferably, a seal 54 surrounds the collar 53 to prevent leakage at this interface. The arm 102 preferably includes a hole 106 adjacent to the collar 53 but located closer to the button 100 than the collar 53. Thus, when the button 100 is depressed (along arrow J of FIG. 7) the collar 53 is brought out of alignment with the outlet 52 and the hole 106 is brought into alignment with the outlet 52 of the air conduit 50 (FIG. 4). Air can then pass through the hole 106, through the outlet 52 and into the space S (along arrow K of FIG. 7). This air can originate within the housing 20 which is generally able to induct air from outside of the housing 20 through seams in the housing 20.

As the air returns into the space S, preferably the outlet 52 remains at least partially aligned with the collar 53 and lower tube 55 so that air also returns into the air conduit 50 and the indicator 70 can adjust its position to indicate the return of air pressure into the space S. As an alternative, and as depicted in FIG. 7, the indicator 70 can be returned to its elevated position indicative of return of pressure into the space S by causing the collar 50 to be opened to the space within the housing 20. A spring 104 is preferably provided at an end of the arm 102 opposite the button 100 (FIGS. 4-6). This spring 104 biases the button 100 in a first position with the collar 53 aligned with the outlet 52.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An apparatus for removing air from a space, the apparatus comprising in combination:
    an air containing enclosure;
    said enclosure having at least two portions including a neck of a bottle defining a first portion and an air removal outlet surface defining a second portion, said outlet surface including a lower surface wall;
    an air conduit passing through said lower surface wall of said outlet surface and away from said enclosure;
    a pump coupled to said air conduit, said pump adapted to remove air from said enclosure;
    wherein a seal is interposed between said first portion and said second portion, said seal adapted to reduce leakage of air into said enclosure between said first portion and said second portion;
    wherein a pump activation switch is coupled to said outlet surface, said pump activation switch adapted to be selected by placement of said first portion of said enclosure adjacent said second portion of said enclosure, such that said pump is activated by closing of said enclosure; and
    wherein a tilt sensor is coupled to said pump said tilt sensor adapted to interrupt power to sump and deactivate said pump when said tilt sensor detects tilting of said outlet surface greater than a predetermined amount.

2. The apparatus of claim 1 wherein said seal includes a substantially cylindrical inner sleeve, said inner sleeve of said seal including at least one rib extending radially away from an outer surface of said inner sleeve, said rib circumscribing said inner sleeve to form a complete circuit.

3. The apparatus of claim 1
    wherein said seal includes an annulus adapted to abut a rim of the neck of the bottle, said pump activation switch having a portion thereof located adjacent said annulus, such that said switch is selected by said rim of said neck of said bottle approaching said annulus.

4. The apparatus of claim 1 wherein said pump is adapted to shut off when a predetermined amount of air has been removed from said enclosure.

5. The apparatus of claim 4 wherein said air conduit is in fluid communication with a sensor tube, such that air pressure within said sensor tube is similar to air pressure within said air conduit, an indicator shaft coupled to said sensor tube, said indicator shaft biased toward a first position further from said sensor tube than a second position, said indicator shaft adapted to be drawn from said first position toward said second position as pressure of air within said sensor tube is reduced.

6. The apparatus of claim 5 wherein a switch plate is coupled to said indicator shaft, said switch plate adapted to switch off said pump when said switch plate moves toward said second position sufficient to indicate that said predetermined amount of air has been removed from said enclosure.

7. The apparatus of claim 5 wherein said indicator shaft is coupled to said sensor tube through a bellows, said bellows adapted to be collapsed from a longer form corresponding with said first position for said indicator shaft and a shorter form corresponding with said second position for said indicator shaft, said bellows having an interior thereof coextensive with an interior of said sensor tube.

8. The apparatus of claim 5 wherein said indicator shaft is coupled to a piston, said piston located within said sensor tube and adapted to slide within said sensor tube, said piston moving from said first position for said indicator shaft to said second position for said indicator shaft when air pressure within said sensor tube is reduced.

9. The apparatus of claim 1 wherein said enclosure includes an air return path coupled to an air return button, said air return button adapted to be manually manipulated by a user.

10. The apparatus of claim 1 wherein a temperature sensor passes through said outlet surface defining said second portion of said enclosure and into said enclosure, said temperature sensor coupled to a display, said display adapted to visually communicate a temperature within said enclosure.

11. An apparatus for removing air from a space, the apparatus comprising in combination:
an air containing enclosure;
said enclosure having at least two portions including a neck of a bottle defining a first portion and an air removal outlet surface defining a second portion;
an air conduit passing through said outlet surface and away from said enclosure;
a pump coupled to said air conduit, said pump adapted to remove air from said enclosure;
wherein said enclosure includes an air return path coupled to an air return button, said air return button adapted to be manually manipulated by a user; and
wherein said pressure return path includes said air conduit passing through said outlet surface defining said second portion of said enclosure, said air conduit coupled to a lower tube leading to said pump, said lower tube formed of flexible material, said lower tube having an end adjacent said enclosure coupled to an arm at a collar, said collar having a port therein through which air can pass on its way to said pump, said arm having an inlet hole passing therethrough separate from said collar, said inlet hole selectively alignable with said outlet by movement of said arm to align said inlet hole with said outlet rather than said collar, said arm biased toward a first position with said collar aligned with said outlet and with said hole selectively alignable with said outlet by movement of said arm, said arm coupled to said air return button, said inlet hole in said arm coupled to a source of atmospheric pressure air, such that alignment of said inlet hole with said outlet causes air to return into the bottle.

* * * * *